Patented Feb. 9, 1954

2,668,802

UNITED STATES PATENT OFFICE 2,668,802

POLYMERIC VINYL PHENOL-ALDEHYDE RESINS

Edward Michael Evans and John Edward Seager Whitney, Tonbridge, England, assignors to British Resin Products Limited, London, England, a British company No Drawing. Application November 16, 1949, Serial No. 127,783

Claims priority, application Great Britain November 24, 1948

9 Claims. (Cl. 260—33.4)

The present invention relates to the production of novel resins by the condensation of an aldehyde with polymeric material containing units of a vinyl phenol compound in its molecular structure.

By "vinyl phenol compound" is meant the ortho, meta and para vinyl phenols and their lower nuclear homologues having at least one, and preferably two unsubstituted nuclear hydrogen atoms in the reactive ortho or para position with respect to the phenolic hydroxy group such as the methyl, ethyl and propyl substituted derivatives, and their polymers and copolymers may be prepared by the processes described in our copending applications, Serial No. 127,781, filed November 16, 1949, and Serial No. 127,782, filed November 16, 1949.

According to the present invention copolymerized products are obtained by subjecting to polymerization conditions a mixture of a vinyl phenol compound with one or more of the following compounds: styrene and alpha methyl styrene, acrylic compounds, vinyl esters, vinyl ethers, vinyl ketones N-vinyl compounds and polymerizable allyl compounds. The "vinyl phenol compound" may be formed by dehydrogenation and/or cracking of a phenol-substituted open-chain hydrocarbon.

By "acrylic compound" is meant acrylic acid, alpha-substituted acrylic acids and their derivatives, such as methacrylic acid, alpha-ethyl acrylic acid, alpha-chlor-acrylic acid, alpha fluor-acrylic acid, methyl acrylate, ethyl acrylate, butyl methacrylate, ethyl methacrylate, methyl alphachloracrylate, acrylonitrile, methacrylonitrile and acrylyl chloride, acrylamide and methacrylamide.

Suitable vinyl organic esters include the formate, acetate, propionate, butyrate and stearate; suitable vinyl ethers include the methyl, ethyl, isopropyl, butyl, phenyl, tolyl, naphthyl, vinyl, and propenyl ethers, while suitable vinyl ketones include the methyl, ethyl, isopropyl and butyl ketones.

By "N-vinyl compounds" is meant heterocyclic compounds having a nitrogen atom in the ring to which is attached a vinyl group, suitable examples including N-vinyl carbazole, N-vinyl pyrole and N-vinyl piperidine.

By "polymerizable allyl compounds" is meant those polymerizable compounds having a prominent allyl group in the molecule, and the esters of allyl alcohols, allyl ethers and allyl substituted aldehydes and ketones and their acetals and ketals are included. Suitable examples of allyl esters include esters of alcohols such as allyl, methallyl, ethallyl, chlorallyl, crotonyl and cinnamyl alcohols, butene-1-ol-3, pentene-1-ol-3 and butadiene-2:3-ol-1 and polyhydric allyl alcohols with acids such as formic, phenoxy formic, acetic, lactic, butyric, glycollic, salicylic and oleic acid. In many cases, as with the acetals and ketals of allyl substituted aldehydes and ketones, where a reactive group in the comonomer has been maintained in a dormant state during the polymerization, further chemical reaction of this group can readily be effected in the copolymer.

The comonomers may be present in any proportions, for instance from 5 to 95% by weight of either with corresponding amounts of the other. In addition butadiene-type compounds may be employed by which is meant butadiene and its polymerisable derivatives retaining the two conjugated unsaturated linkages such as isoprene, 2:3 di-methylbutadiene and chloroprene.

We have found that, when a polymer or copolymer comprising vinyl phenol units is reacted with an aldehyde or aldehyde-generating agent such as formaldehyde, butyraldehyde or furfuraldehyde, hexamethylene tetramine or paraformaldehyde, condensation takes place with conversion of at least some of the vinyl phenol units to the methylol derivatives with consequent thermo-setting characteristics in the resin. The aldehyde material may be incorporated into the polymeric material which may, if desired, be dissolved in a suitable solvent, or a body of polymeric material may be treated superficially with aldehyde to give rise to a thermosetting layer on the surface. Where the polymer or copolymer has been produced by emulsion or dispersion polymerisation, the latex or suspension of copolymer particles may be treated directly with the aldehyde.

It is preferred that catalysts should be used to accelerate the condensation, and alkalis such as sodium hydroxide, or acids, such as succinic acid, are suitable. Inorganic acids may be used, but are not preferred because of their somewhat deleterious effect on the resin produced. It is also preferred that the polymer or copolymer used should be free from, or deficient in, ortho vinyl phenol-type units, as the material then exhibits a much higher reactivity towards aldehydes.

A particularly valuable feature of this invention is that it enables an originally thermoplastic polymer or copolymer to be rendered thermo-setting and more resistant to the action of water, acids and alkalis and solvents, an effect which may be utilised, for example, in the production of a rapid stoving lacquer base by the treatment of a vinyl phenol copolymer with an aldehyde such as formaldehyde in a suitable solvent, such as an alcohol, a ketone, or a lower ester. When the copolymer contains a substantial proportion of vinyl phenol units, and particularly when the comonomer is of a polar nature, the reaction may be effected in aqueous, aqueous alcoholic or alcoholic alkaline solution. The amount of aldehyde used will depend on the desired degree of cross-linking of the polymer chains and on the molecular weight of the polymeric material, an increase in the vinyl phenol content increasing the degree of crosslinking it is possible to bring about. Preferably, at least one molecule of aldehyde is employed for every twenty molecular units in the polymeric material, but smaller amounts may be employed if only a slight degree of hardening is required.

If desired, when the aldehyde condensation has not extended to all the vinyl phenol units, some or all of those remaining may be subjected to etherification as described in our copending application, Serial No. 127,784, filed November 16, 1949.

The following examples illustrate the production of the new resins of this invention, the parts referred to being by weight.

Example 1

100 parts of a mixture of equal parts of meta vinyl phenol and styrene was maintained at 100° C. for 16 hours to give a clear, soft, rubbery copolymer. 5 parts of succinic acid were incorporated in the resulting material at a temperature of 120–150° C., and the mass was cooled to 100° C. 25 parts by weight of paraformaldehyde were then incorporated and the mass was cooled. The resulting material was heated at 120° C. and rapidly hardened to an infusible mass.

Example 2

A sheet of a copolymer of 25% meta vinyl phenol with 75% styrene, prepared as set forth in our copending application Serial No. 127,782, was suspended for one hour at 60° C. in a bath consisting of 5% of sodium hydroxide dissolved in 37.5% w./w. formaldehyde solution. At the conclusion of this period the sheet was removed, rinsed with dilute acid, washed with water, dried and cured at 80° C. for two hours, the resulting effect being best described as case hardening.

In following the procedure of Example 2 the thickness of the hardened section may be increased by any or all of the following means, namely, increasing the vinyl phenol content of the copolymer, increasing the sodium hydroxide content of the formaldehyde bath, increasing the time of soaking in the formaldehyde bath and incorporating a proportion of a lower alcohol, ketone, or other water-compatible organic solvent capable of softening the resin in the formaldehyde bath.

Example 3

50 parts of colourless substantially pure meta vinyl phenol polymer, which had been prepared by allowing meta vinyl phenol to polymerise to the soft rubbery state for a week at approximately 18° C. in a closed vessel in the absence of any catalyst, was masticated two successive times with 50 parts of benzene, broken into coarse lumps and gradually comminuted to a fibrous white powder in two successive 100 part portions of benzene. The benzene was then separated by filtration and the powder was washed with 100 parts of benzene in small portions and dried to yield 20 parts of a high molecular weight poly meta vinyl phenol in the form of a white, free-flowing coarse powder.

10 parts of this powder were dissolved in 40 parts of 5% aqueous sodium hydroxide solution, and 13.1 parts of 37.5% formaldehyde solution (equi-molecular with the vinyl phenol content of the resin) were added. After standing at 50° C. for one hour the alkali was neutralised by the addition of normal sulphuric acid and the polymeric methylol vinyl phenol was thereby precipitated as a white powder. This was separated by filtration, the cake was washed with water, comminuted and dried under vacuum by the application of gentle heat. The resulting free-flowing white powder could be used as a lacquer or moulding powder constitutent as described above.

Example 4

100 parts of poly meta vinyl phenol was incorporated with 30 parts of dibutyl phthalate on a dough mixer-type mill at 120° C. and the mixture, on becoming homogeneous, was cooled to 100° C. and blended with 18.1 parts of hexamethylene tetramine within a period of 15 minutes. The mass could then be formed and cured under pressure at a temperature exceeding 120° C., for example, 155° C. for 5 minutes. In the production of moulding powder, any other desired ingredients such as fillers, dye-stuffs, pigments and mould lubricants should be incorporated prior to the addition of hexamethylene tetramine.

Example 5

A series of styrene m-vinyl phenol copolymers were prepared by mixing styrene and m-vinyl phenol in the following proportions and heating them for 16 hours at 100° C.

90% styrene, 10% m-vinyl phenol
75% styrene, 25% m-vinyl phenol
50% styrene, 50% m-vinyl phenol
25% styrene, 75% m-vinyl phenol At the conclusion of this period a quantity of hexamethylene tetramine was thoroughly mixed with each at 100° C. such that the formaldehyde liberated by the hexamine was unimolecular with the phenolic hydroxyl units.

In every case heating at 120–130° C. brought about gelation followed by progressive hardening. On cooling to room temperature the resultant products were found to be extremely hard.

Example 6

A sheet of a copolymer prepared by polymerising equal weight of acrylonitrile and m-vinyl phenol in the presence of tertiary butyl hydroperoxide (1% on combined monomers) was suspended in a solution consisting of:

5 parts of acetaldehyde
5 parts of potassium hydroxide
90 parts of industrial methylated spirit for 30 minutes at 40° C. At the conclusion of this period the sheet was removed, rinsed with cold water and suspended in a 2% sulphuric acid solution for 15 minutes, rinsed again with cold water, allowed to dry in warm air overnight, then stoved at 130° C. for 30 minutes, by which time it had become infusible and hard upon cooling.

Example 7

To 100 parts of synthetic latex containing 30% of a copolymer of 75% methyl acrylate and 25% m-vinyl phenol were added 10 parts of 0.880 S. G. ammonia solution, followed by 10 parts of 37.5% aqueous formaldehyde solution. The mass became warm owing to the exothermic formation of hexamethylene tetramine and upon cooling to room temperature films were prepared upon glass plates, allowed to dry at room temperature and stoved at 130° C. for 30 minutes. At the conclusion of this period they were examined and found to be substantially colourless, transparent and, as distinct from films prepared from the original latex, no longer soluble in a mixture of equal volumes of alcohol and benzene.

Example 8

50 parts of the synthetic latex used in Example 7 were rendered just alkaline (pH 9) by the addition of N/2 sodium hydroxide solution. 10 parts of a 37.5% solution of formaldehyde were then added and reaction allowed to proceed at room temperature for 24 hours. The methylol derivative of the copolymer was then isolated, after neutralisation to pH 7 by means of a dilute aqueous solution of sulphuric acid, by coagulation with a 10% aqueous solution of sodium chloride, separated by filtration, washed with water and air dried by exposing it as a thin layer in a shallow dish at room temperature for 48 hours with occasional turning and disintegration. This material was found to be capable of being formed by pressure at a temperature in excess of 100° C. and thermoset rapidly at 130° C.

Example 9

100 parts of a benzene soluble polymer prepared by interpolymerising a mixture of 75% styrene with 25% o-vinyl phenol in the presence of a tertiary butyl hydroperoxide catalyst, was incorporated with 5 parts hexamethylene tetramine by grinding. It was then heated under light pressure for 30 minutes at a temperature of 150° C. by which time it had become insoluble in benzene.

Amongst the copolymers which may be condensed with aldehydes according to this invention are those of vinyl phenol compounds with comonomers such as styrene compounds, vinyl naphthalenes, acenapthalene, N-vinyl compounds such as N-vinylcarbazole, cyclopentadiene, vinyl esters, acrylic esters, unsaturated aldehydes such as acrolein, and allylic compounds. The copolymers may contain any proportion of the vinyl phenol units. If desired, the polymeric material employed may be freed from monomers and low molecular weight polymers by extraction with suitable solvent, such as benzene, prior to condensation with the aldehyde.

We claim:

1. A process as claimed in claim 6 wherein the molecular ratio of aldehyde to polymeric material is at least 1:20.

2. A process as claimed in claim 6, wherein the polymeric material is in solution when condensed with the aldehyde.

3. A process as claimed in claim 6, wherein the polymeric material is in aqueous dispersion.

4. A process as claimed in claim 6, wherein a condensation catalyst is also present.

5. A process as claimed in claim 6, wherein the resin is hardened by stoving.

6. A process for the production of a resin which comprises, condensing a polymeric material with an aldehyde selected from the group consisting of formaldehyde and compounds forming formaldehyde under the reaction conditions, acetaldehyde, butyraldehyde and furfuraldehyde, said polymeric material having in its molecular structure polymer units selected from the group consisting of ortho, meta and para vinyl phenol polymer units and their lower nuclear homologue polymers having at least one unsubstituted reactive nuclear hydrogen atom in the nucleus.

7. A resin comprising the condensation product of an aldehyde selected from the group consisting of formaldehyde and compounds forming formaldehyde under the reaction conditions, acetaldehyde, butyraldehyde and furfuraldehyde and a polymeric material, said polymeric material having in its molecular structure polymer units selected from the group consisting of ortho, meta and para vinyl phenol polymer units and their lower nuclear homologue polymers having at least one unsubstituted reactive nuclear hydrogen atom in the nucleus.

8. A rapid stoving lacquer base comprising the condensation product of a copolymer of a compound selected from the group consisting of: ortho, meta and para vinyl phenols and their lower nuclear homologues having at least one unsubstituted reactive nuclear hydrogen atom in the nucleus with another copolymerizable compound, with an adehyde selected from the group consisting of formaldehyde and compounds forming formaldehyde under the reaction conditions, acetaldehyde, butyraldehyde and furfuraldehyde, in a solvent selected from the group consisting of liquid alcohol and a liquid lower ester.

9. A process as claimed in claim 6, wherein the polymeric material is a copolymer of a compound selected from the group consisting of: ortho, meta and para vinyl phenols and their lower nuclear homologues having at least one unsubstituted reactive nuclear hydrogen atom in the nucleus with another copolymerisable compound containing at least 1 and not more than 2 polymerisable groups having the structure $CH_2=C<$.

EDWARD MICHAEL EVANS.
JOHN EDWARD SEAGER WHITNEY.

References Cited in the file of this patent

UNITED STATES PATENTS

| Number | Name | Date |
|---|---|---|
| 2,223,550 | Harvey | Dec. 3, 1940 |
| 2,499,365 | De Groote | Mar. 6, 1950 |
| 2,594,579 | Novotny | Apr. 29, 1952 |